H. C. MAISE.
AUTOMOBILE BODY.
APPLICATION FILED FEB. 23, 1917.

1,251,990.

Patented Jan. 1, 1918.
2 SHEETS—SHEET 1.

Herman C. Maise Inventor

By his Attorneys

H. C. MAISE.
AUTOMOBILE BODY.
APPLICATION FILED FEB. 23, 1917.

1,251,990.

Patented Jan. 1, 1918.
2 SHEETS—SHEET 2.

Herman C. Maise Inventor
By his Attorneys

UNITED STATES PATENT OFFICE.

HERMAN C. MAISE, OF DETROIT, MICHIGAN, ASSIGNOR TO SPRINGFIELD BODY CORPORATION OF NEW YORK, OF NEW YORK, N. Y., A CORPORATION OF NEW YORK.

AUTOMOBILE-BODY.

1,251,990.

Specification of Letters Patent.

Patented Jan. 1, 1918.

Application filed February 23, 1917. Serial No. 150,372.

*To all whom it may concern:*

Be it known that I, HERMAN C. MAISE, a citizen of the United States, and a resident of the city of Detroit, county of Wayne, and State of Michigan, have invented an Improvement in Automobile-Bodies, of which the following is a specification.

My invention relates to sliding windows which may be used in connection with automobile bodies, and which are particularly useful in connection with automobile bodies of the "Springfield type," in which it is desired to entirely remove the windows and the supports or sash therefor, so as to obtain a construction in which the entire sides of the body are open to secure an unobstructed view.

My invention also has for its object to produce a type of window frame which may be readily removed by one person alone, without leaving the interior of the body and which, when removed, may carry with it the window. In such a construction it is possible to store the window and frame in a suitable storage compartment provided in the body, the window being fixed in position in the frame when it is removed, so that the window is at all times protected from breakage, and the entire structure, window and frame together may be replaced in one operation.

I further aim to provide a construction which is peculiarly adapted to the use of metal sections and to manufacture upon a large scale.

Figure 1:
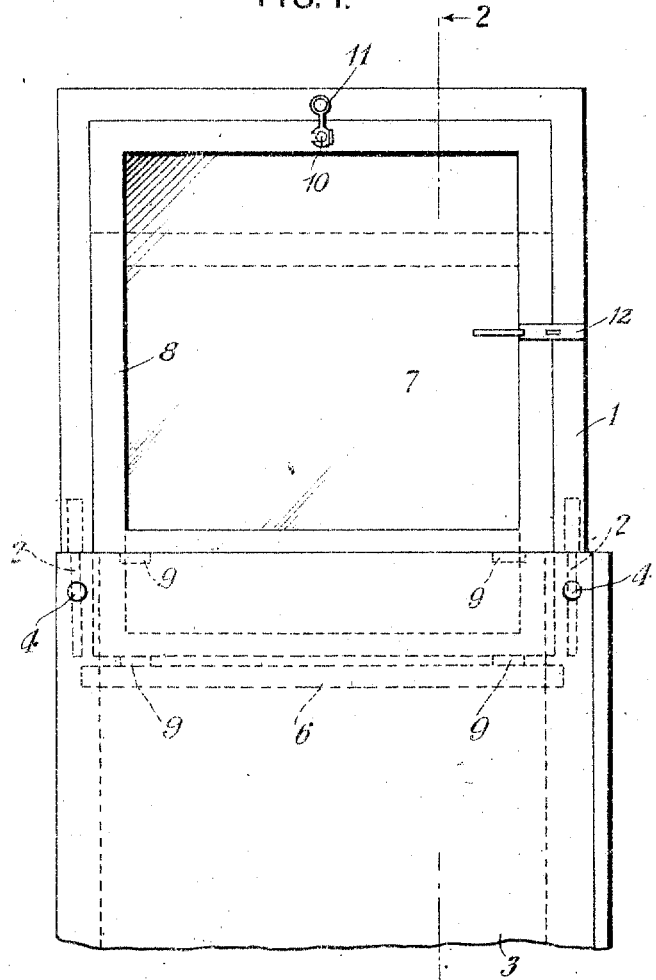
Figure 2:
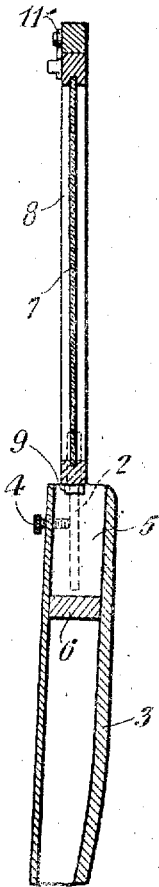
Figures 6, 7:
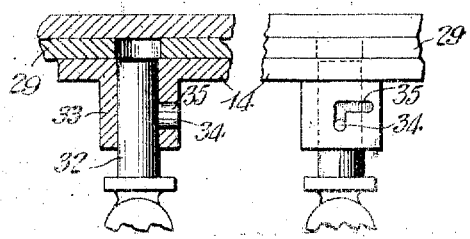
Figure 3:
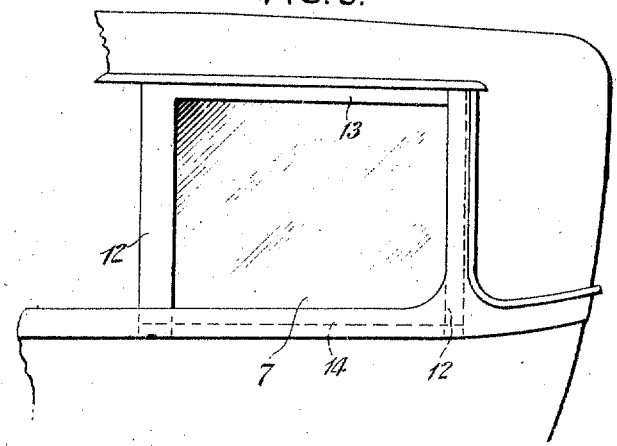
Figure 4:
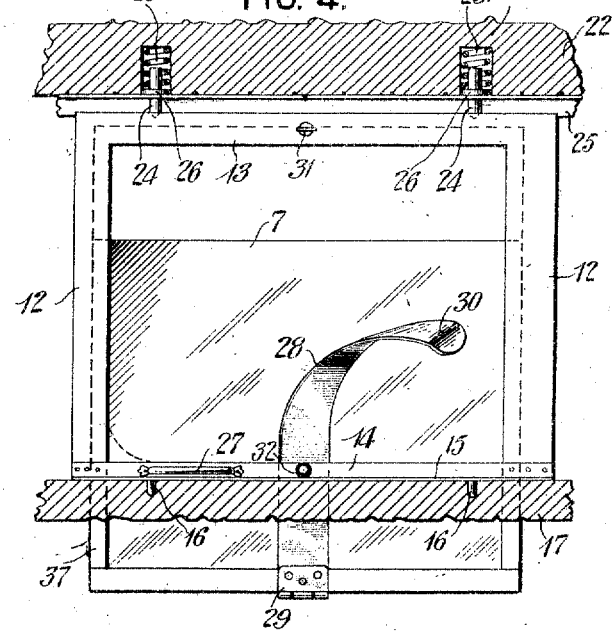
Figure 5:
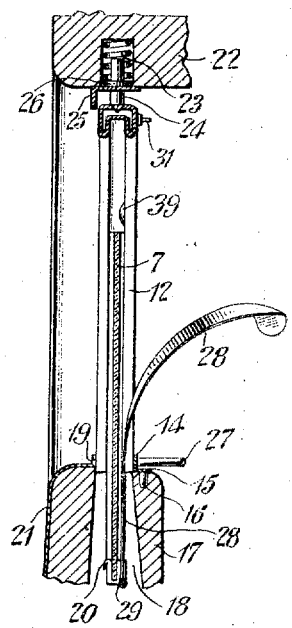
Figure 8:
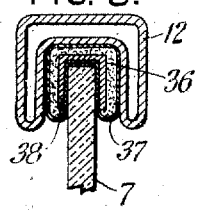

In the drawings I have shown in Figure 1 a side view of a door window, embodying my invention in a simple form; in Fig. 2 I have shown a vertical sectional view of the door shown in Fig. 1; in Fig. 3 I have shown my invention applied to the quarter window of an automobile body; Fig. 4 is a side view on a larger scale of the quarter window, the body being shown partly in section; Fig. 5 is an end sectional view of the window illustrated in Fig. 4; Figs. 6 and 7 are detailed views of a fastening means for the window and Fig. 8 is a sectional detailed view through the window showing the construction of the window frame and the protection applied to the edge of the window.

In Figs. 1 and 2, the construction includes a window frame 1, provided with two or more studs or pins 2, adapted to enter depressions or recesses in the door 3, and held in place by means of thumb screws 4 or other suitable means. The door 3 is provided with a recess 5, the depth of which may be limited by a stop 6 if desired.

Sliding within the window frame 1, is a window 7, which may be supplied with a sash 8 if desired, or may be of the now more widely used sashless type. The window 7 is provided at its lower edge with bumpers 9 adapted to contact with stop 6, if used, and at its upper edge with a button 10 adapted to coöperate with a hook or other fastening means 11, attached to the window frame. The window frame may also be supplied with a catch 12, for holding the window in any desired intermediate position.

In this embodiment of my invention, when it is desired to remove the window, it is only necessary to raise the window to its full height and fasten it in position by means of the hook 11 and button 10, to loosen the thumb screws 4 and then lift out the entire structure, which includes the window frame and the window, the window being thus held in position when the window frame is detached. The window frame with its detached window may then be stored in any suitable storage compartment, and owing to the fact that the window remains in the frame, when the frame is detached, it is always protected from injury.

In the embodiment of my invention shown in Figs. 3, 4 and 5, I prefer to provide a metallic window frame comprising three rolled tubular channel portions, of the general form shown in Fig. 8, these channel portions being the stiles 12 and the horizontal top rail 13. Connecting the lower ends of the stiles is a horizontal cross member in the form of an angle, the vertical flange 14 of the angle being attached to the stiles and the horizontal flange 15 carrying studs or projections 16, adapted to enter corresponding depressions in the body portion 17 below the window. By means of this arrangement, I am enabled to support the window frame immediately above the recess 18 in the body portion 17, so as to permit the window 7 to slide in the frame and drop into the recess. A stop (not shown), may be provided to limit the downward movement of the window, but in the case of the quarter window of an automobile body, the downward movement of the window is usually limited by the top of the wheel house. A fence 19 is provided, which coöperates with a channel 20 carried by the lower edge of the window, the fence being conveniently formed in the case of a metal body by turning up a flange from the sheathing 21 on the exterior of the body. The body portion 22 immediately above the window is recessed in order to take the springs 23 which actuate the plungers 24. The plungers 24 pass through the angular window stop 25 and are each provided with a shoulder 26 to engage the upper side of the horizontal flange of the window stop. The assembling of this portion of my device is a very simple matter, since it is only necessary to place the springs in position in the recesses, place the plunger in position in the flange of the window stop and then attach the window stop to the body portion by screws, or in any suitable manner.

The lower ends of the plungers 24 engage depressions in the top rail of the window to hold it in position, and sufficient clearance is provided between the top rail of the window and the horizontal flange of the window stop to enable the frame to be lifted by means of the handle 27 until the projections 16 clear the recesses in the body portion 17.

I have provided means for holding the window in the window frame when the latter is removed. This means may take a variety of forms, for instance, I have shown in Figs. 4 and 5 the usual pull strap 28, which is attached to the lower edge of the window by means of the hinge clamp 29, and is provided at its free end with an aperture 30. The aperture 30 engages a suitable button fastener 31 attached to the top rail of the window frame. Another attaching means is shown in Figs. 4, 6 and 7 and comprises a plunger 32 which may be moved in and out through a boss 33, attached to the vertical flange 14 of the angular cross member at the bottom of the window frame. The movement of the plunger 32 is limited and the plunger is locked in position, by means of the pin 34 operating in the bayonet slot 35. When the plunger is in the position shown in Figs. 6 and 7, the window may be moved up and down by means of the strap. When, however, it is desired to lock the window, the window is raised to its limit of upward movement and the plunger is pushed inwardly, engaging a hole in the hinge clamp 29.

Inasmuch as it is difficult to form tapering slides in the window stiles I prefer to use a channel shaped slide of uniform width in connection with a window pad or edge protector, (see Fig. 8) which includes a padding of felt or other suitable material 36, held in place by a cover 37, the whole being secured to the window by means of a metallic channel 38. The padding 36 is sufficiently soft to cushion the window against the sides of the channel in any position, and at the same time to permit movement of the lower end of the window outward to enable the channel 20 to engage the fence 19. In order to hold the window in position securely, I may provide a pivoting point 39 about which the window swings when the channel 20 is being engaged with the fence 19. This pivoting point may take the form of a small spring or may even be merely a small piece of metal soldered in place.

When in place the window may be lowered into the recess 18 in the body portion, it being held in position by means of the pull strap 28. When it is desired to remove the window and window frame, the window is raised to its upward limit and fastened in place by means of the pull strap 28 and button 31 or by means of the plunger 32. The frame is then lifted against the springs 23 by holding the handle 27 with one hand and the stiles 12 with the other, until the projections 16 are released from the depressions in the body portion 17. The frame is then drawn inwardly and removed from the window opening and stored in a suitable storage place.

I do not intend to confine myself to the particular embodiments of my invention illustrated and described, since it will be evident to those skilled in the art that these embodiments may be greatly modified without departing from the spirit of my invention.

What I claim is:

1. In a device of the kind described, a body portion containing a recess, a window frame detachably secured thereto above the recess and a window slidably mounted in and adapted to be lowered from the window frame into the recess.

2. In a device of the kind described, a body portion containing a recess, a window frame detachably secured thereto above the recess and a window slidably mounted in the window frame for lowering into said recess and adapted to be removed with the window frame when it is removed from the body portion.

3. In a device of the kind described, a body portion containing a recess, a window frame detachably secured thereto above the recess, a window slidably mounted in the window frame for lowering into the recess, and means to hold the window in the frame when the latter is detached.

4. In a device of the kind described, a body portion having a recess, a window frame carrying a stud adapted to enter a corresponding depression in the body portion and a window slidably mounted in the window frame and adapted to be lowered into the recess.

5. In a device of the kind described, a body portion having a plurality of depressions and a recess, a window frame having a plurality of studs at its lower edge adapted to coöperate with said depressions and a window slidably mounted in said frame and adapted to be lowered into said recess.

6. In a device of the kind described, a body portion provided with a window opening and a recess, a window frame detachably mounted upon the body portion and projecting over the recess, a window adapted to be lowered into said recess, a window frame stop at the upper side of the window opening and a spring plunger projecting through the window frame stop and engaging the upper edge of the window frame.

7. In a device of the kind described, a body portion having a window opening and a depression, a window frame, a window frame stop attached to the body portion along the upper side of the window opening, a plunger having a shoulder passing through the window frame stop into the depression in the body member and a spring contained within the depression and adapted to force the plunger outwardly through the stop.

8. In a device of the kind described, a body portion having a recess, a window adapted to be lowered into the recess and a window frame within which the window is adapted to slide mounted over the recess, comprising a horizontal lip projecting from the frame and adapted to rest upon the body portion.

9. In a device of the kind described, a body portion, having a recess and a depression, a window adapted to be lowered into the recess and a window frame mounted above the recess, comprising an angular member secured at its lower edge by means of its vertical flange, the horizontal flange of the angular member being provided with a pin adapted to engage the depression in the body member.

10. In a device of the kind described, a window frame comprising a pair of vertical channel shaped guides, an angular member connecting said vertical guides at the lower ends thereof and frame positioning means secured to said angular member.

11. In a device of the kind described, a window frame comprising a pair of vertical channel shaped guides, a channel shaped connecting member connected to said guides at their upper ends, an angular member connected to said guides at their lower ends by its vertical flange and positioning means secured to and carried by the horizontal flange of said angular member.

In testimony whereof, I have signed my name to this specification.

HERMAN C. MAISE.